United States Patent [19]
Mangus et al.

[11] 3,894,554
[45] July 15, 1975

[54] LIQUID LEVEL CONTROLLER

[75] Inventors: James D. Mangus, Greenburg;
Arnold H. Redding, Export, both of Pa.

[73] Assignee: The United States Energy Research and Development Administration, Washington, D.C.

[22] Filed: May 10, 1972

[21] Appl. No.: 251,992

[52] U.S. Cl. .............. 137/206; 137/255; 137/575
[51] Int. Cl. ............................................. F28d 7/06
[58] Field of Search .......... 137/206, 209, 403, 255, 137/575, 207; 138/30

[56] References Cited
UNITED STATES PATENTS
2,880,745  4/1959  Regan .................... 138/30 X
3,148,745  9/1964  Jones .................... 137/207 X Primary Examiner—Alan Cohan

[57] ABSTRACT

A system for maintaining two distinct sodium levels within the shell of a heat exchanger having a plurality of J-shaped modular tube bundles each enclosed in a separate shell which extends from a common base portion. A lower liquid level is maintained in the base portion and an upper liquid level is maintained in the shell enwrapping the long stem of the J-shaped tube bundles by utilizing standpipes with a notch at the lower end which decreases in open area as the distance from the end of the standpipe increases and a supply of inert gas fed at a constant rate to produce liquid levels, which will remain generally constant as the flow of liquid through the vessel varies.

13 Claims, 3 Drawing Figures

LIQUID LEVEL CONTROLLER

BACKGROUND OF THE INVENTION

This invention relates to heat exchangers and more particularly to a system for maintaining distinct liquid levels in different portions of the vessel as the flow of liquid through the shell side of the vessel varies.

The demand for electrical power in the United States approximately doubles every ten years. Presently fossil fuel provides a majority of the heat energy needed to produce electrical power. In the next thirty years, it is estimated that over 50% of our electrical power will be produced by heat energy resulting from nuclear reactions. The supply of fissionable material is limited, so that the future of nuclear power generation depends on developing fast breeder reactors, which produce more fissionable material than they consume. In view of the present technology, such a system anticipates the use of a liquid metal, such as sodium, as the primary heat exchange medium which is to be circulated through the nuclear reactor and produce steam by transferring heat from the liquid metal flowing through the shell side of a heat exchanger to water flowing through the tubes. The use of J-shaped modular heat exchangers has been proposed in an application assigned to the same assignee, having Ser. No. 120,423 and filed Mar. 3, 1971. Such a heat exchanger requires a level control system, which will maintain each liquid level generally constant and allow for normal structural and flow variations between different portions of the vessel to prevent flooding and starvation of the portions thereof.

SUMMARY OF THE INVENTION

In general, a system for maintaining multiple levels of liquid flowing through a vessel having a lower portion and an upper portion wherein the portions are so disposed that an opening placing the portions in communication is disposed below the first liquid level maintained in the lower portions of the vessel, when made in accordance with this invention, comprises means for supplying a pressurized gas to the lower portion at a predetermined rate forming a first gas space above the first liquid level, a standpipe in communication with the first gas space and with the first liquid level, the standpipe having openings disposed above and below the first liquid level the openings being disposed to increase and decrease the open area exposed to the first gas space as the first level moves, respectively, downwardly and upwardly. The standpipe is also in communication with a second gas space disposed at an elevation above the second liquid level maintained in the upper portion of the vessel and the system further comprises means for maintaining the second gas space generally at a predetermined pressure.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
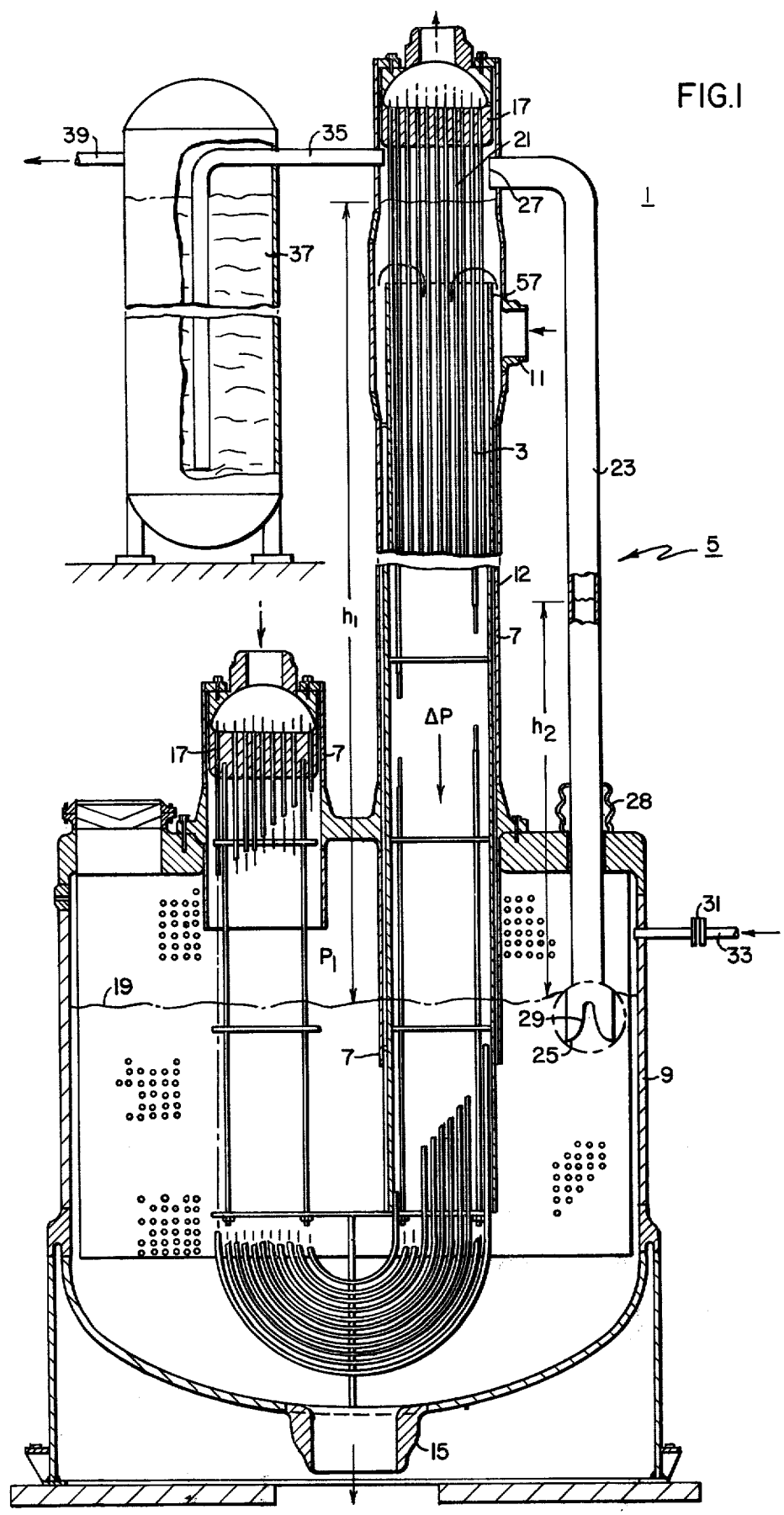
FIG. 1 is a vertical sectional view of a heat exchanger having a level control system made in accordance with this invention.
Figure 2:
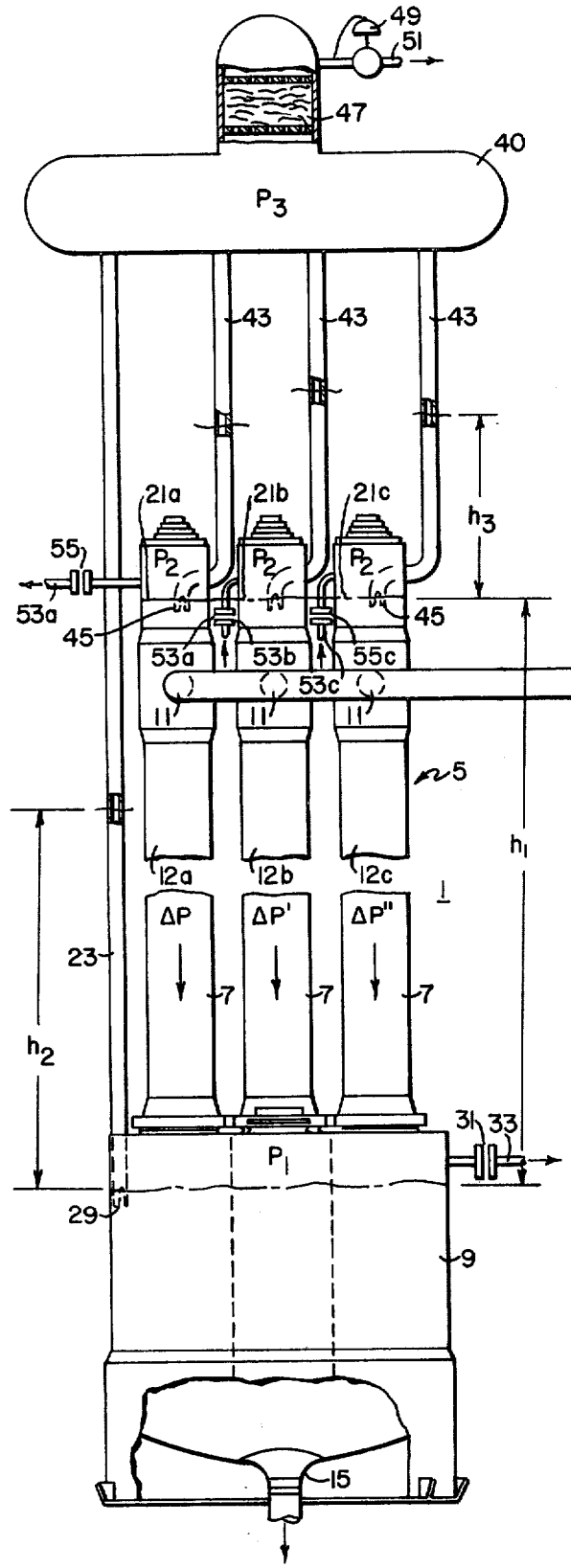
FIG. 2 is an elevational view of two vessels disposed to allow series flow of liquid and having a level control system made in accordance with this invention.
Figure 2:
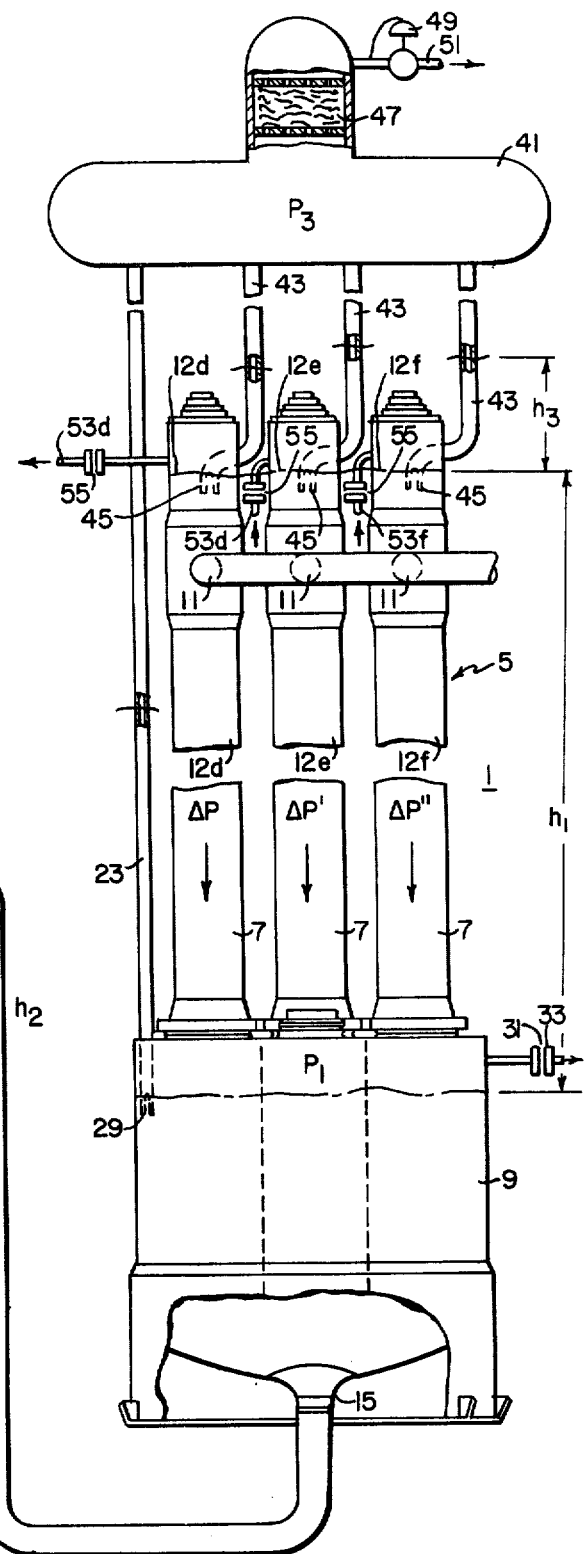
Figure 3:
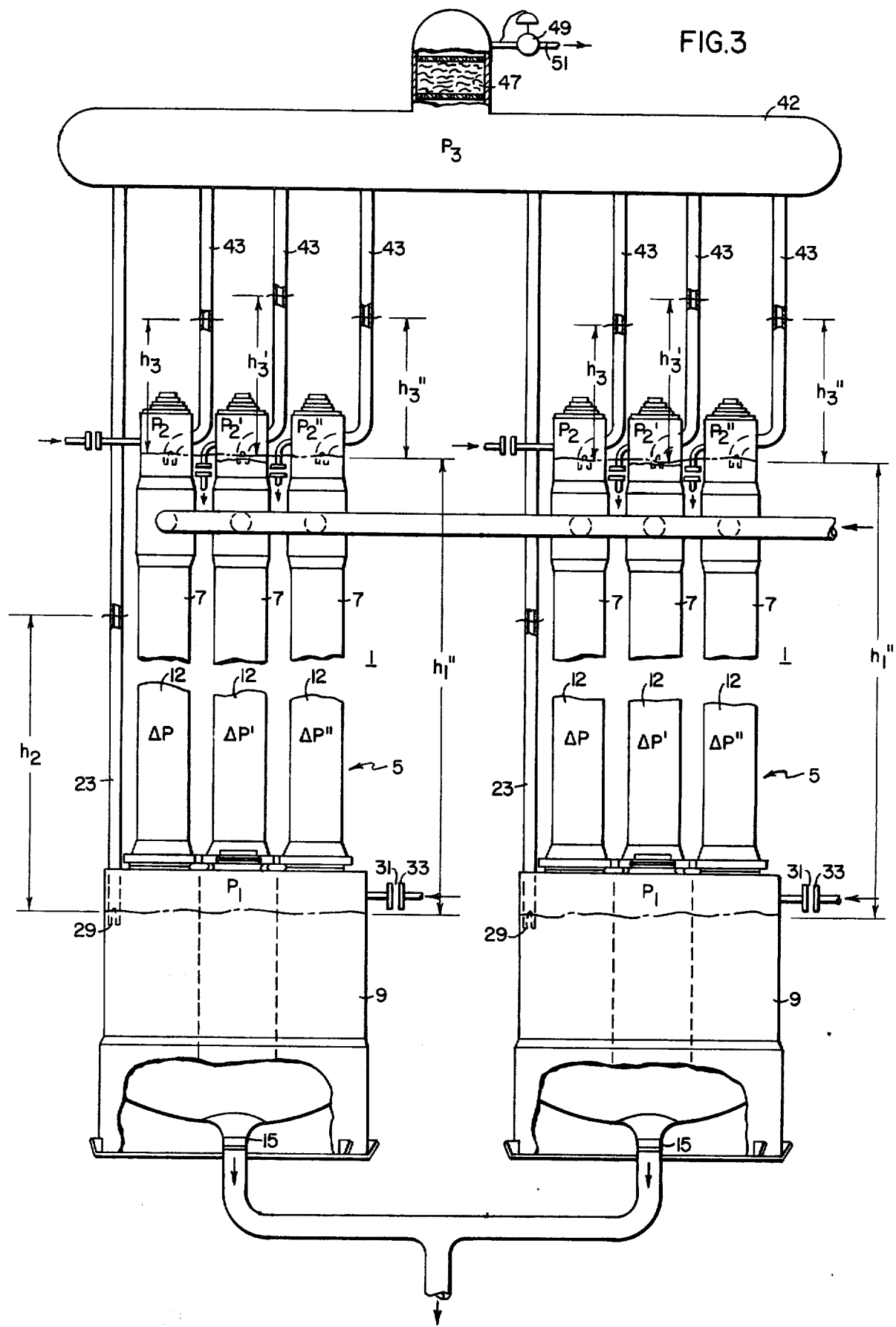
FIG. 3 is an elevational view of two vessels disposed to allow for parallel flow of liquid and having a level control system made in accordance with this invention.

Referring now to the drawings in detail, FIGS. 1 through 3 show evaporator, superheater or reheater units utilized to transfer heat from a liquid metal to water or steam in a fast breeder nuclear reactor power plant (not shown).

The heat exchangers 1 are shown to comprise one or more modular J-shaped tube bundles 3 disposed in a common vessel 5 formed from cylindrical shells 7 enwrapping the stem of the J-shaped tube bundles 3 and a base portion or plenum chamber 9 which receives the arcuate portions of the J-shaped tube bundles.

Liquid metal, for example sodium, is introduced through an inlet nozzle 11 in the upper end of the shell 7 enwrapping the long stem portions of the J-shaped tube bundles, which hereinafter will be referred to as the upper portion 12 of the vessel, flows downwardly along the outside of the tubes 13 and into the base or lower portion 9 and through the outlet nozzle 15 depending from the lower end of the base portion 9. To protect the tube sheet 17 and the associated welds from the effects of the liquid metal, an inert gas blanket is maintained adjacent the tube sheet 17, producing two liquid levels 19 and 21 within the vessel 5.

The lower liquid level 19 is maintained at a level above the opening at the lower end of the cylindrical shell 7 enwrapping the long stem of the tube bundles, which places the upper portion 12 of the vessel 5 in communication with the lower portion 9 thereof.

The upper level 21 is maintained above the inlet nozzle 11.

As shown in FIG. 1, a standpipe or riser tube 23 is so disposed that the lower end 25, thereof, extends below the lower liquid level 19 and the upper end 27, thereof, is in communication with the upper portion 12 of the vessel 5 above the liquid level 21.

A bellows 28 forms a seal between the standpipe 23 and the lower portion 9 of the vessel and allows for differential thermal expansion between the standpipe 23 and the vessel 5.

The standpipe 23 has a notch 29 in the lower end 25 thereof. The notch 29 is so disposed as to extend above and below the lower liquid level 19 and generally decreases in open area as the distance from the end 25 of the standpipe 23 increases. To provide the proper control, the notch 29 decreases in area at an exponential rate as the distance from the end 25 of the standpipe 23 increases.

Inert gas is supplied to the lower portion 9 of the vessel 5 at a controlled predetermined rate via an orifice 31, or other means, disposed in a conduit 33 in communication with the lower portion 9 of the vessel 5. Thus, the lower liquid level 19 is maintained by providing a generally constant mass flow of inert gas into the gas space above the lower liquid level, which provides a pressure which causes the liquid to be maintained in the upper portion 12 of the vessel 5 and in the standpipe 23 until the notch 29 is partially uncovered allowing the inert gas to escape up the standpipe 23 and bubble through the liquid contained therein at the same rate it enters the lower portion 9 of the vessel 5. The pressure in the gas space above the upper liquid level 21 is maintained by the gas flowing up the standpipe 23 and is maintained at a generally constant pressure by bleeding the gas through a conduit 35, which is so disposed as to cause the gas to flow to the lower end of a head tank 37 and bubble up through a liquid partially filling the tank 37 and out a discharge nozzle 39 which bleeds off the gas, which has bubbled up through the liquid, maintaining the gas in the gas space above the upper liquid level 21 at a generally constant pressure.

As shown in FIGS. 2 and 3 the lower portions 9 of the vessels 5 and the lower end of the standpipes 23 are identical with the lower portion of the vessel 5 and the lower portion of the standpipe 23 shown in FIG. 1. In FIGS. 2 and 3, however, the vessels 5 each have three upper portions 12a, 12b, and 12c, and 12d, 12e and 12f respectively, generally the same as the upper portion 12 and each upper portion has a distinct upper liquid level 21a, 21b, and 21c, and 21d, 21e, and 21f, respectively, and an upper gas space associated therewith. Gas headers or tanks 40, 41 and 42 form upper gas spaces disposed at an elevation above the upper liquid levels 21a, 21b, and 21c and 21d, 21e and 21f. Each upper portion 12a, 12b and 12c and 12d, 12e and 12f has a standpipe or riserpipe 43, which is in communication with the associated upper liquid level. A notch 45 on the lower end thereof forms an opening which is disposed to extend above and below the associated upper liquid level. The notches 45 are formed to decrease in open area exponentially as the distance from the end of the riser pipe increases.

The upper end of the standpipes 23 and riser pipes 43 are in communication with the gas spaces provided in the tanks 40, 41 and 42. A mesh pad 47 or other separating means is disposed in the tanks 40, 41 and 42 to remove liquid from the gas. Constant pressure venting means 49, such as a constant pressure bleed valve is disposed in a bleed conduit 51 in communication with the tanks 40, 41 and 42.

Inert gas at a predetermined flow rate is supplied to the lower portions 9 of the vessels 5 via the orifice 31 disposed in conduits 33.

Inert gas at a predetermined flow rate is supplied to the upper portions 12a, 12b, 12c and 12d, 12e and 12f via conduits 53a, 53b, and 53c, and 53d, 53e, and 53f, respectively, and orifices 55. The inert gas continuously supplied to the gas spaces above the various levels cooperates with the openings 45 in the lower ends of the riser pipes 43 to vary the pressure of the gas space and appreciably change the height to which liquid rises in the riser pipes 43 in response to a very small change in elevation of the liquid levels to compensate for changes in the rate of liquid flow through the vessels.

Each upper portion 12 is distinct and therefore may produce a different pressure drop when passing the same mass of flow of fluid, therefore, to accommodate this difference, to maintain equal flow rates in each portion of the vessel, and to eliminate flooding in one portion and starvation in another portion, requires that standpipes be sufficiently long to accommodate a head of liquid equal to the difference in pressure between the portions having the greatest variance in pressure drop.

FIG. 2 shows two vessels 5 disposed to allow series flow of liquid therethrough and each vessel has a separate header tank 40 and 41 to allow the vessels to be disposed at different elevations and to provide for different pressure drops in each vessel. While series flow is shown, such an arrangement could also be adapted to accommodate parallel flow, even though the pressure drops through the vessels are substantially different.

In FIG. 3 the vessels 5 are disposed to provide parallel flow therethrough and generally each vessel is disposed at the same elevation so that all the riser tubes 43 are in communication with a common header 42 which is maintained at a predetermined pressure by a constant pressure bleed valve 49 or other means.

The operation of the system as shown in FIG. 1 is as follows: liquid metal, such as sodium, is supplied to the inlet nozzle 11 and flows upwardly and over a wrapper 57, enwrapping the tube bundles 3 and then flows downwardly over the outside of the tubes 13 and into the lower portion 9 of the vessel 5. Liquid levels 19 and 21 are maintained at predetermined levels by supplying inert gas to a gas space above the lower liquid level 19 at a fixed rate through orifice 31. The inert gas produces a pressure $P_1$ in the lower gas space. The gas passes through the opening 29 in the lower portion of the standpipe 23 bubbling up through the liquid contained therein and flows into the upper gas space associated with the liquid level 21. This upper gas space is maintained at a constant prsesure $P_2$ by bleeding the gas through a constant head tank 37. The liquid in the upper portion of the vessel 5 raises to a height $h_1$ above the liquid level 21 in the lower portion of the vessel and liquid raises to a height $h_2$ in the standpipe 23, which is the height above the liquid level in the lower portion of the vessel. $\Delta P$ is the pressure drop of the fluid as it flows through the upper portion 12 of the vessel 5. The density $d_1$ and $d_2$ of the liquid measured of the respective heights $h_1$ and $h_2$ varies depending on the temperature and quantity of inert gas bubbling through the liquid. Thus, the relationship between the various pressures and heads of liquid and pressure drop may be expressed by the following formulas:

$P_1 = P_2 + d_1 h_1 - \Delta P$ $P_1 = P_2 + d_2 h_2$

Utilizing these formulas to solve for $\Delta P$, $\Delta P = d_1 h_1 - d_2 h_2$ This indicates that in the system, as shown in FIG. 1, the pressure drop through the upper portion of the shell must be less than the static head of the liquid in the upper portion thereof.

In FIGS. 2 and 3, if the fluid flow is through the inlet nozzle 11 and out the exit nozzle, $P_1$ is equal to the pressure maintained in the gas space above the lower liquid level; $P_2$ is equal to the pressure maintained in the gas space above the upper liquid level; $P_3$ is equal to the pressure of the gas space maintained in the headers 40, 41 and 42; $h_1$ is equal to the height that liquid rises in the upper portion 12 of the vessel 5 above the lower level 19; $h_2$ is equal to the height that liquid rises in the standpipes 23; $h_3$ is equal to the level to which liquid rises in the riser pipes 43; $\Delta P$ equals the pressure drop in any upper portion of the vessels and $d_1$, $d_2$ and $d_3$ equals the density of the associated liquid heights; the relationship between the pressure, the height of the liquid, and the pressure drop in any upper portion of the vessels can be expressed by the following formulas:

$P_1 = P_3 + d_2 h_2$ $P_2 = P_3 + d_3 h_3$ $P_1 = P_2 + d_1 h_1 - \Delta P$ combining these formulas and solving for $\Delta P$:

$$\Delta P = d_1 h_1 + d_3 h_3 - d_2 h_2$$

Therefore, in the arrangements shown in FIGS. 2 and 3 the pressure drop through any upper portion of the vessels is determined by the difference in the heads of liquid in the riser and standpipes 43 and 23 respectively as the head maintained in the upper portions of the vessel varies only a small amount.

A level control system, as hereinbefore described, having gas spaces supplied with a constant rate of inert gas has the advantage that a change in the operating conditions, which tend to change the level of the liquid as the liquid flows through the vessels varies, produces a very slight change in liquid level and an appreciable change in the open area of the opening in the lower end of the standpipe or riser pipe to increase the pressure in the gas spaces and raise the liquid levels in the standpipes, or riser pipes causing the system to reach equilibrium with a minimum change in liquid levels. If there is a sudden or large change in the flow of liquid in the shell side of the vessel the liquid levels rise to cover the openings in the ends of the standpipes and riser pipes and inert gas continues to flow into the gas spaces increasing the pressure of the gas in the gas spaces and cuasing the liquid to flow back toward it normal liquid levels. If on the other hand there is a sudden reduction in the flow of liquid and the levels drops, the open areas at the ends of the standpipes and riser pipes increases rapidly, which causes the pressures in the gas spaces to drop reducing the pressure on the surfaces of the liquid and causing the liquid to return to its normal levels. If the levels drop below the ends of the standpipes and riser pipes the rate at which the pressure would drop would be very rapid producing a system which maintains the liquid levels within a small deviation from a predetermined level and yet responds rapidly to correct large changes in level.

The rate at which the inert gas is supplied to the various gas spaces may be low, reducing the quantity of exhaust gas that must be handled and yet provides rapid response to large variations in level caused by large changes in the flow rate through the vessels.

The liquid level control system, hrerinbefore described, controls the liquid levels in each vessel and each portion thereof and maintains them within very small deviations from a predetermined elevation irrespective of the flow of liquid through the vessel and variations in pressure drop through the distinct portions of the vessels. Such a system may advantageously comprise very few or no moving parts, which reduces the maintenance and increases the reliability of the system without sacrificing accuracy or speed of response.

What is claimed is:

1. A system for maintaining multiple liquid levels of a liquid flowing through a vessel having a lower portion and at least one upper portion, said portions being so disposed that an opening placing said portions in communication is disposed below a first liquid level maintained in said lower portion, said system comprising means for supplying a pressurized gas to said lower portion at a predetermined rate forming a first gas space above said first liquid level, a standpipe in communication with said first gas space and with said first liquid, said standpipe having opening means disposed above and below said first liquid level, said opening means being disposed to increase and decrease the open area exposed to the first gas space as the first levels move, respectively, downwardly and upwardly, said standpipe also being in communication with a second gas space disposed at an elevation above a second liquid level maintained in said upper portion of said vessel and means for maintaining said second gas space generally at a predetermined pressure.

2. A system as set forth in claim 1, wherein the means for maintaining a second gas space at a predetermined pressure comprises means for venting the second gas space, said venting means being adapted to vent gas from the second gas space when the pressure exceeds a predetermined value.

3. A system as set forth in claim 1, wherein the vessel comprises a plurality of upper portions, each upper portion having a distinct liquid level, which is generally equal in elevation to the second liquid level and a distinct gas space associated with each distinct liquid level, and further comprises standpipes associated with and in communication with each distinct gas space, each of said last-mentioned standpipes having opening means disposed therein, the opening means being disposed above and below each associated distinct liquid level and so disposed as to increase and decrease the open area exposed to the associated gas space as the distinct liquid levels more, respectively, downwardly and upwardly.

4. A system as set forth in claim 3, and further comprising means for supplying gas at a predetermined rate to each distinct gas space.

5. A system as set forth in claim 1, wherein the opening means comprises a single opening which increases in open area in a downward direction.

6. A system as set forth in claim 1, wherein the opening means comprises a notch in the lower end of the standpipe so arranged to decrease the open area exponentially as the distance from the end of the standpipe increases.

7. A system for maintaining multiple levels of liquid flowing through a plurality of vessels each vessel having a lower portion and at least one upper portion said portions being so disposed that an opening placing the portions of each vessel in communication is disposed below a lower liquid level maintained in the lower portion of each vessel, said system comprising means for supplying pressurized gas to the lower portion of each vessel forming a lower gas space in each vessel above said lower liquid level, a standpipe for each vessel each standpipe being in communication with saidd lower gas space and the liquid in the lower portion of the associated vessel, each standpipe having opening means, said opening means being disposed above and below the lower liquid level in the associated vessel and disposed to increase and decrease the open area exposed to the associated gas space as the liquid level moves downwardly and upwardly, respectively, said standpipe also being in communication with an upper gas space disposed above an upper liquid level in the upper portions of said vessels and means for maintaining a predetermined pressure in the upper gas space, each of said upper portions of said vessels having a distinct liquid level and a distinct gas space associated therewith, means for supplying pressurized gas to each of said distinct gas spaces at a predetermined rate, a separate riser pipe in communication with each distinct upper level and each distinct gas space and opening means disposed in said riser pipes, said opening means being disposed in said riser pipes, said opening means being disposed both above and below the associated liquid levels and so arranged to provide an increase in open area exposed to the gas space as the liquid level is lowered, whereby the liquid levels are maintained within a small deviation from a predetermined level irrespective of the changes in the rate of flow of the liquid flowing through the vessel.

8. A system as set forth in claim 7, wherein the opening means comprises a single opening which increases in size in a downward direction.

9. A system as set forth in claim 7, wherein the opening means comprises a notch in the lower end of the standpipe, said notch being formed to decrease in open area as the distance from the end of the standpipe increases.

10. A system as set forth in claim 7, wherein the opening means comprises a notch in the lower end of the standpipe, said notch being formed to decrease in open area at an exponential rate as the distance from the end of the standpipe increases.

11. A system as set forth in claim 7, wherein the vessels are so disposed to provide parallel liquid flow through the shell side thereof.

12. A system as set forth in claim 7, wherein the vessels are so disposed to provide series liquid flow through the shell side thereof.

13. A system as set forth in claim 7, wherein each vessel has associated therewith a separate gas space disposed above the upper liquid levels formed in the upper portion of said vessel.

* * * * *